Sept. 9, 1930.                R. O. CLARK                1,775,421
                              LAWN MOWER
                    Filed Aug. 8, 1928      3 Sheets-Sheet 1
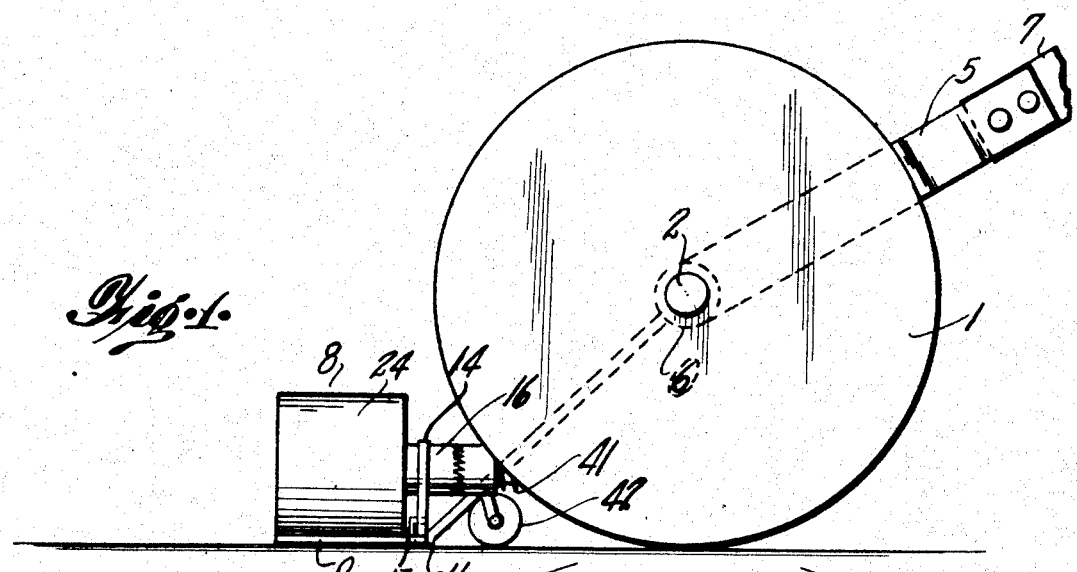
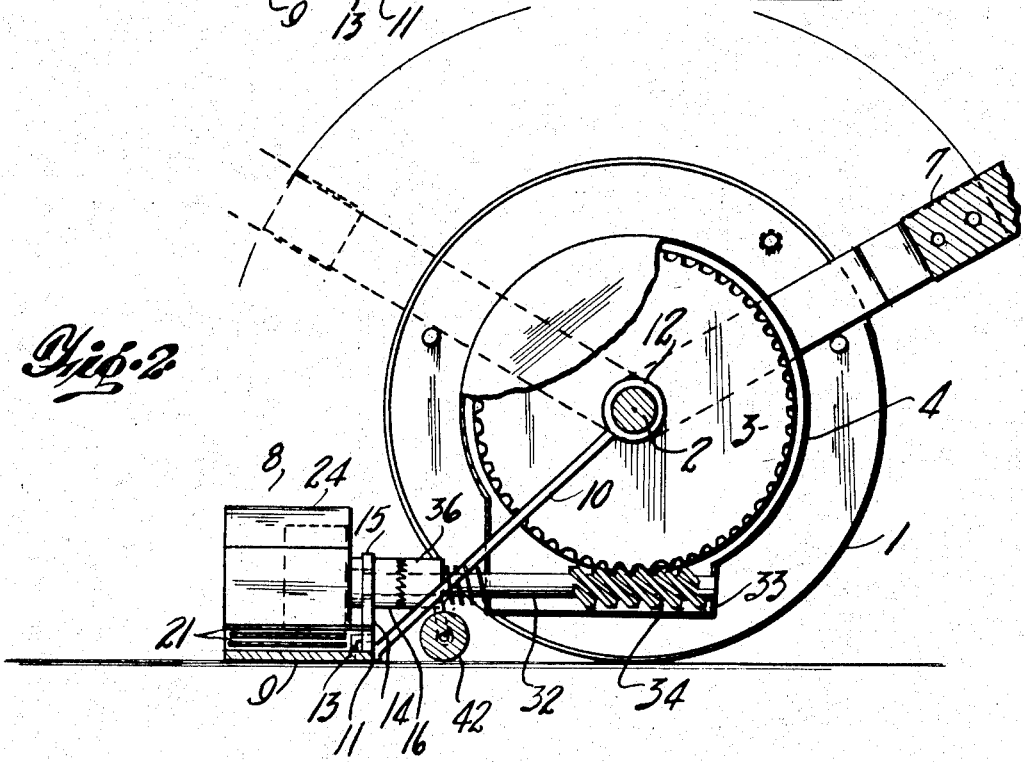
Inventor
Ralph Otto Clark.
By Adam E. Fisher.
Attorney Sept. 9, 1930.  R. O. CLARK  1,775,421
LAWN MOWER
Filed Aug. 8, 1928  3 Sheets-Sheet 2

Inventor
Ralph Otto Clark.
By Adam E. Fisher.
Attorney

Sept. 9, 1930. R. O. CLARK 1,775,421
LAWN MOWER
Filed Aug. 8, 1928 3 Sheets-Sheet 3
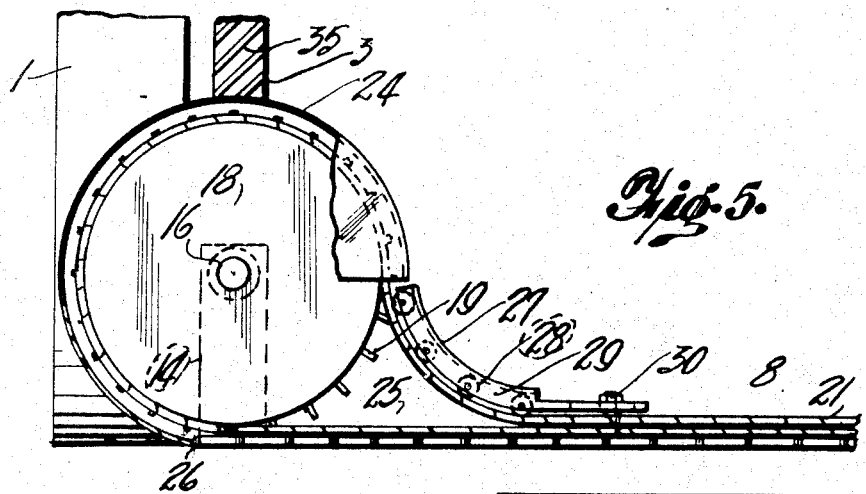
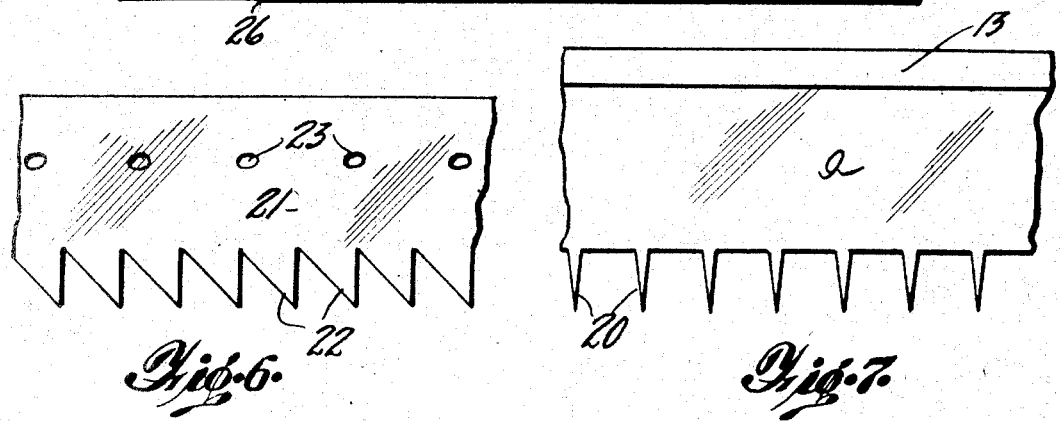
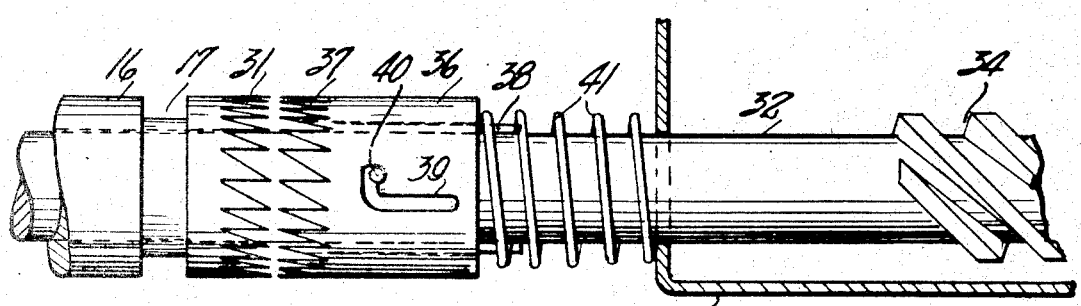
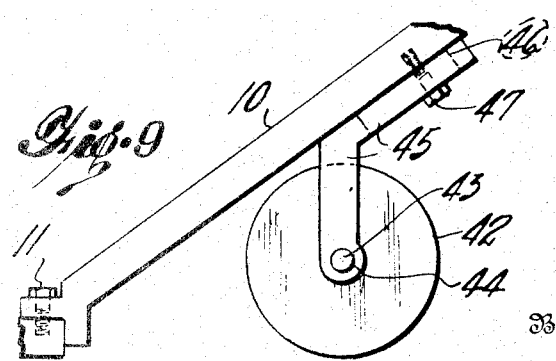
Inventor
Ralph Otto Clark
By Adam E. Fisher
Attorney Patented Sept. 9, 1930

1,775,421

UNITED STATES PATENT OFFICE

RALPH OTTO CLARK, OF ESTHERVILLE, IOWA

LAWN MOWER

Application filed August 8, 1928. Serial No. 298,144.

This invention relates to a lawn mower, and the object is to provide a lawn mower of simple and durable construction and wherein is embodied a band cutter of flexible steel traveling continuously in one direction in lieu of the usual reciprocating sickle bar or revolving knives.

In the drawing

Figure 1 is an outside end elevation;

Figure 2 is an inside elevation of one end of the machine, a portion of the gear housing being broken away, and the roller and guard rail being shown in section;

Figure 5 is an enlarged detail of one end of the machine, portions of the sprocket and gear housing being broken away, as well as the upper portion of the drive wheel;

Figure 6 is an enlarged detail of a portion of the band cutter;

Figure 7 is an enlarged detail of a portion of the guard rail;

Figure 8 is an enlarged detail of one of the drive shafts and clutch mechanisms as employed at each side of the machine;

Figure 9 is an enlarged detail of the adjustable roller.

Figure 3:
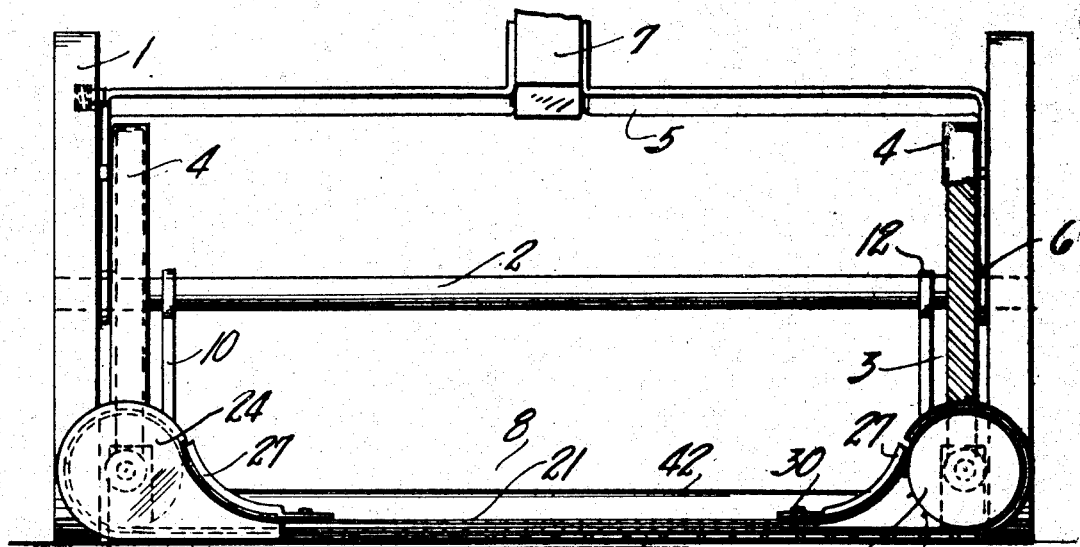
Figure 3 is a frontal elevation, a portion of the gear housing at the right side being broken away.
Figure 4:
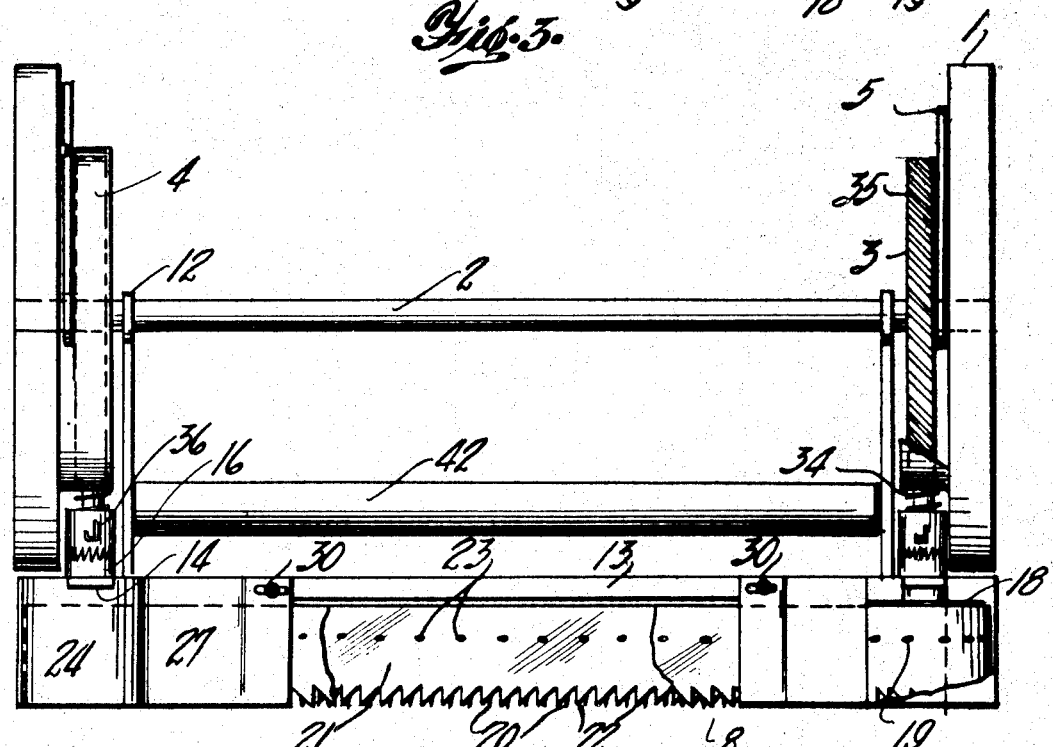
Figure 4 is a plan view, a portion of the gear housing at the right side being broken away.

The mower comprises two relatively large drive wheeels 1 rigidly set at the ends of the axle shaft 2. Two worm wheels 3 are also rigidly set upon the axle shaft 2 slightly spaced from the drive wheels 1. The teeth 35 of the wheels 3 are pitched at an angle of substantially forty-five degrees and in the same direction, that is to say, the extended axes of the teeth would be parallel. This is, of course, necessary that the teeth may co-operate in driving the band cutter in one direction. Suitable housings 4 are provided for the wheels 3. A U-shaped handle loop 5, having the rings 6 at its ends, is loosely attached to the shaft 2 between the wheels 1 and 3, by passing the shaft through the rings. A handle 7 is extended from the loop 5. A cutting assembly 8 is supported in front of the drive wheels 1. This assembly includes a guard rail 9 which is supported in proper position at the front of the machine by two arms 10 secured at one end as shown at 11 to the rear edge of the rail and angularly extended up to the shaft 2 to which they are loosely connected by the rings or ferrules 12. The rear margin of the rail 9 is raised at the upper face as shown at 13 to form the bolster or support or guide for the band cutter, as will be detailed later.

Journal brackets 14 are extended up at either end of the rear margin of the rail 9 in alignment with the worm wheels 3, these brackets having the journal rings 15 at their upper ends. Tubular stub shafts 16 are journaled through these rings, the latter turning in grooves 17 cut in the former, so as to lock the shafts against any longitudinal sliding movement. Upon the forward ends of the shafts 16 are rigidly mounted the sprockets 18 having the teeth or prongs 19 extended radially, the arrangement being such that the sprockets 18 are adapted to rotate immediately above the ends of the guard rail 9 and clear of the elevated guides 13. The guard rail 9 is provided with the forwardly extended guards 20 in spaced relation along its forward edge. An endless band cutter 21, of flexible strip steel or the like, having the cutting teeth 22 formed along its forward edge, and a series of sprocket holes 23 along its rear margin for engaging the prongs 19 of the sprockets 18, is trained over the said sprockets and along upon the top side of the rail 9 in front of the raised guide 13, and suitable circular housings 24 are mounted over the sprockets 18, the housings being open at their under sides as shown at 25 for the ingress and egress of the band cutter, and being secured to the ends of the rail 9, as shown at 26.

Arcuate guides 27, channeled at their under sides and having a series of rollers 28 journaled therein between the flanges 29, are extended from the upper margin of the openings 25 of the housings 24 inwardly over the ends of the rail 9 and have their ends properly anchored to the said housings and the said rail as shown at 30. These guides 27 serve to depress the band cutter 21 onto the rail 9 adjacent the housings 24 and hold the cutter in proper operative position at the top of the said rail. The rear circular edges of the stub shafts 16 are formed with a plurality of clutch teeth 31. Drive shafts 32 are journaled through brackets 33 depending from the lower sides of the housings 4 and are suitably locked against longitudinal movement. The forward ends of the shafts 32 are projected into the tubular shafts 16, and worms 34 are formed upon the rear ends of these drive shafts 32, the said worms being placed in mesh with the teeth 35 of the worm wheels 3 and being of a suitable pitch to operatively function when impelled by the teeth of the wheels 3. Clutch sleeves 36 each having a plurality of clutch teeth 37 for co-acting with the teeth 31 of the shafts 16 are slidably mounted upon the forward ends of the shafts 32 and prevented from rotating by keys 38 in the usual manner. L-shaped lock slots 39 are formed through the walls of the sleeves 36 for coacting with studs 40 seated in the shafts 32, to hold the sleeves 36 in their retracted position when desired, with the teeth 37 out of engagement with the teeth 31. Coil springs 41 are braced between the sleeves 36 and the brackets 33 for holding the sleeves 36 forwardly with the teeth 37 in mesh with the teeth 31, when desired.

In operation, the drive wheels 1 and worm wheels 3 rotate the worm shafts 32, which in turn rotate the sprockets 18 and cause the band cutter 21 to travel steadily in one direction along and over the rail 9, thereby cutting the grass as same passes between the teeth 22. It will be noted that the teeth 22 at the upper and lower sides of the band cutter 21 will travel in opposite directions in the operation of the machine, thereby facilitating the cutting action of the machine. A roller 42 is extended across in front of the wheels 1 and a shaft 43 running through this roller has its ends journaled at 44 in the lower ends of the angular brackets 45, the upper arm of which is slotted longitudinally at 46. Set screws 47 are passed through these slots into the under sides of the arms 10, whereby the roller may be adjusted up or down upon the arms 10, for lowering or raising the cutting assembly 8 for short or long cutting of the grass.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a device of the kind described, an axle shaft, drive wheels at the end thereof, gear wheels upon the axle shaft, a guard rail supported in front of the drive wheels, tubular stub shafts journaled at the ends of the guard rail transversely of the same, clutch teeth upon the rear ends of the stub shafts, sprocket wheels secured to the said stub shafts over the guard rail, an endless band cutter trained over the sprockets along the guard rail, drive shafts operatively engaging the gear wheels at their rear ends and journaled in the aforesaid stub shafts at their forward ends, spring set clutch sleeves slidably mounted on the drive shafts to turn therewith, complementary clutch teeth upon the forward ends of the clutch sleeves adapted to engage the teeth upon the stub shafts, the said clutch sleeves having also L-shaped lock slots through their walls, and studs upon the said drive shafts to engage the said lock slots.

2. In a device of the kind described, an axle shaft, drive wheels on the end thereof, gear wheels on the said axle shaft, a guard rail supported in front of the drive wheels, an upwardly extended bolster along the rear edge of the guard rail, stub shafts journaled transversely across the ends of the guard rail, sprocket wheels secured to the stub shafts over the guard rail, an endless band cutter trained over the sprocket wheels along the guard rail, drive shafts operatively connecting the said gear wheels on the axle shaft and the stub shafts on the guard rail, arcuate guards adjustably secured to the bolster on the guard rail, adjacent the ends thereof, and rollers journaled on the undersides of the said guides in engagement with the band cutter to press the same downward adjacent the guard rail.

In testimony whereof I affix my signature.

RALPH OTTO CLARK.